2,813,017

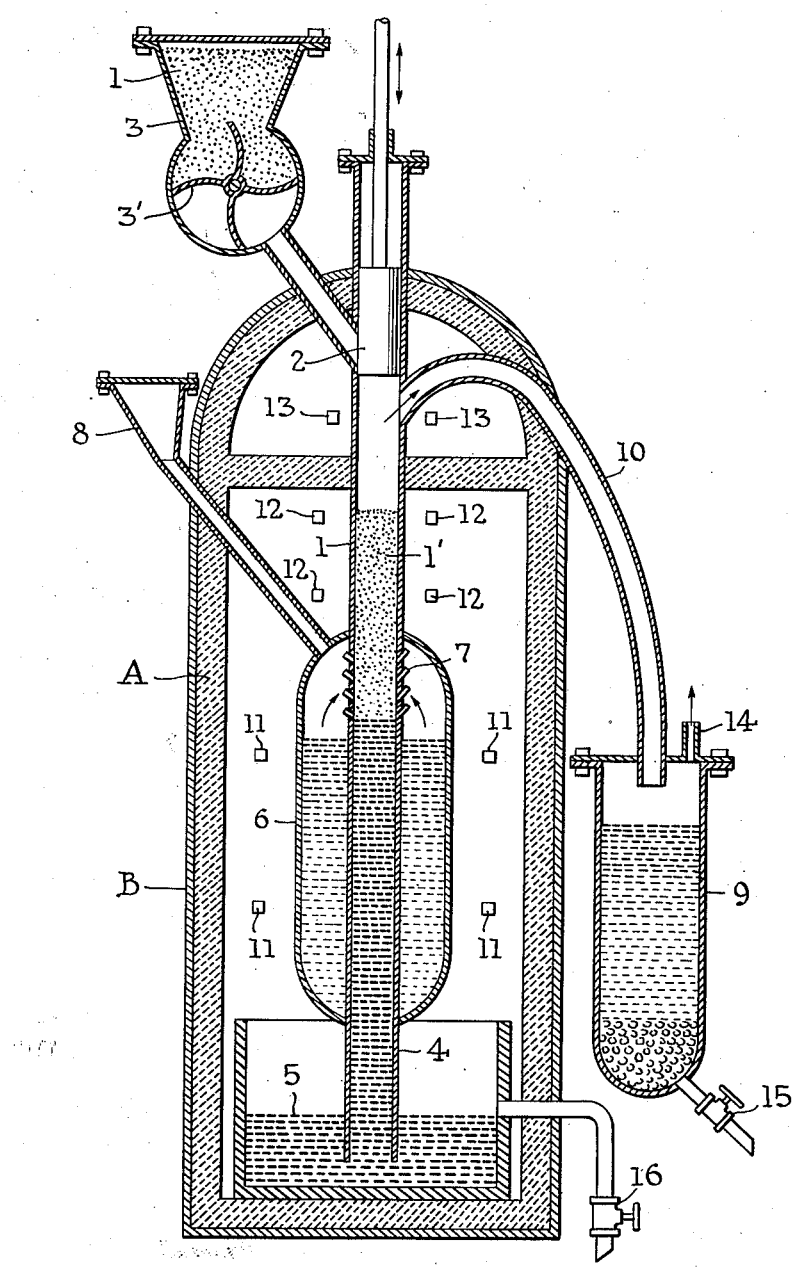

THERMAL PROCESS FOR PRODUCING ALKALI METALS AND MAGNESIUM

François Mathieu, Grenoble, France, assignor to Pechiney, Compagnie de Produits Chimiques et Electrometallurgiques, Paris, France, a corporation of France Application August 26, 1955, Serial No. 530,742

Claims priority, application France September 3, 1954

11 Claims. (Cl. 75—66)

It is known that it is possible to obtain an alkali metal, for example, sodium, by the reaction

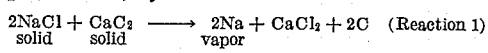
$$2\text{NaCl} + \text{CaC}_2 \longrightarrow 2\text{Na} + \text{CaCl}_2 + 2\text{C} \quad \text{(Reaction 1)}$$
solid    solid         vapor by carrying out this reaction under vacuum and at 800° to 850° C.

This reaction is currently carried out by heating a mixture of a chloride of the alkali metal and calcium carbide in the form of pellets. However, this process has several drawbacks. In the first place, preparation of the pellets is costly. Second, in making the pellets the products must be finely ground and under these conditions, the calcium carbide loses a large part of its activity through contact with air, unless the grinding, transport and pelletizing is carried out in an inert atmosphere of a neutral gas (e. g. $N_2$) which requires the use of costly protective enclosures.

An additional drawback of the known process is the necessity of heating the two constituents to the same temperature, i. e. that necessary for the required reaction to take place. As a result, about twenty percent of the sodium chloride vaporizes without taking part in the reaction and, moreover, condenses in the vicinity of the produced sodium condensate thereby creating difficulties in the latter's recovery.

The process which forms the object of the present invention and which is the result of applicant's researches, obviates the above drawbacks. The new process consists of passing in the vapor phase sodium chloride, potassium chloride or a mixture of the two vapors—such as is produced by the vaporization of sylvinite, which is a mixture of potassium and sodium chlorides—or any other alkali chloride vapor, through a column of granulated calcium carbide which is at a sufficient temperature and of sufficient length to secure complete reaction of the vapor and finally yield in a condenser the desired alkali metal.

In the interest of clarity, only sodium chloride will be discussed in the following description; however, what is stated below is equally applicable to potassium chloride, to a mixture of these two salts, to all other alkali chlorides, as well as to magnesium chloride.

The reaction obtained in the new process is as follows:

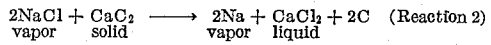
$$2\text{NaCl} + \text{CaC}_2 \longrightarrow 2\text{Na} + \text{CaCl}_2 + 2\text{C} \quad \text{(Reaction 2)}$$
vapor   solid        vapor  liquid It is carried out preferably at temperatures of 800° to 1100° C. and at a pressure of a few millimeters of mercury, preferably less than about 25 millimeters.

At 850° C., the heat absorbed by reaction 1 is about 2260 kcal. per kilo of sodium, whereas the heat absorbed by reaction 2 which is carried out starting from NaCl vapor, is only 430 kcal. per kilo of sodium; hence, the endothermicity of the reaction is considerably less.

This method makes it possible to heat the reducing agent $CaC_2$ to a higher temperature than the chloride and thereby to obtain an adequate reaction temperature without vaporizing an excess of chloride. Granulated calcium carbide is used, for example, of a size within the range of three to ten millimeters, which can be mixed with carbon Raschig or similar spreading elements to facilitate passage of the vapors.

It is advisable to melt the chloride before it is introduced into the vacuum chamber, with the view of dehydrating it.

This invention also comprehends a novel and improved apparatus which is suitable for carrying out the above process.

The present invention, its operation, and advantages will be better understood from the following detailed description, taken in connection with the attached drawing which represents in diagrammatic form, and in vertical cross section, applicant's novel apparatus for carrying out the invention.

As will be observed, the main portions of the apparatus are enclosed within a suitable refractory housing generally designated A, provided with a metallic shell B.

A central vertical column 1 contains the granulated carbide 1' which is supplied thereto by a piston 2. This piston, which operates in a cool zone only, enables the periodic introduction into the reaction zone of additional quantities of calcium carbide fed from the hopper 3 by a star wheel 3'; an equal volume of residual material is removed from the lower barometric column 4 through the valve 16. The residual mixture 5 composed of calcium chloride, carbon resulting from the decomposition of the carbide and impurities present in the carbide, is in the form of a liquid or paste and occupies the lower portion of the column 1.

To facilitate removal of these residual materials, the column 1 may be slightly tapered, widening in a downward direction. The mixture of residual materials ensures a tight seal between the vacuum retort 6 for the sodium chloride and the external space which is at atmospheric pressure, and where the heat is applied (electrically or otherwise).

This barometric column enables continuous removal of the calcium chloride and slag without the necessity of providing an outlet at the bottom of the apparatus.

The annular sodium chloride retort (reservoir) 6 is connected with the central column by orifices or passages 7 which are inclined upwards to prevent molten calcium chloride, resulting from the reaction, from entering the annular retort 6 containing the sodium chloride, since this would produce a gradual decrease in the vapor pressure of the sodium chloride and would prevent its complete utilization. The orifices are provided in the upper part of the annular retort. A heated funnel 8 facilitates charging of the chloride in a molten state into the retort 6.

An oil-filled container 9 is provided to receive the produced sodium and is connected to the central column 1 by a goose-neck 10 which prevents—by its shape—the granulated carbide, pushed by piston 2, from falling into the sodium receiver.

A heating device comprising, for example, electric resistances 11, 12, 13, produces the necessary temperatures at the different parts of the apparatus, as follows:

800–850° C. at the chloride retort zone (by resistances 11)
900–1000° C. at the reaction zone (by resistances 12)
400–500° C. at the beginning of the Na condensing tube (by resistances 13)
100–200° C. on the descending portion of this tube.

While electric heating has been referred to, the heating may likewise be obtained by means of gas, oil or pulverized coal.

The vacuum connection to the apparatus is located at 14 on the sodium receiver 9 so as to facilitate passage of the metallic vapors towards the receiver. The pressure measured at this point is about 0.1 to 0.5 millimeter of mercury. The condensed metal drops by gravity through the oil or other inert liquid filling the receiver 9, is shaped into beads which are removed through the valve 15.

The operating temperatures indicated above are equally suitable for the manufacture of potassium from its chloride and for the production of a potassium sodium alloy from carnallite. For other alkali metals, these temperatures have to be somewhat modified. For example, in the case of lithium the temperatures in the region of resistances 13 and in the tube 10 have to be higher. On the other hand, in the case of rubidium and caesium the temperature of the tube 10 must be reduced.

The process of the present invention is also applicable to the manufacture of magnesium from its chloride. The temperature of the metallic vapor must in this case be maintained above 660° C., and it is preferable to replace the tube 10 and receiver 9 by a standard condenser.

I claim:

1. The process of manufacturing metals selected from the group consisting of alkali metals and magnesium, comprising the following steps: vaporizing a chloride of a metal selected from the said group in a retort; heating a zone containing solid calcium carbide; passing the metallic chloride vapors through said heated zone while maintaining in said zone a pressure substantially less than atmospheric, whereby the chloride vapors are reduced and metallic vapors are produced; condensing the last mentioned metallic vapors, and recovering the condensed product.

2. A process according to claim 1 wherein the zone is heated to a temperature within the range of about 800°–1100° C.

3. A process according to claim 1 wherein the pressure in the reducing zone is less than about 25 millimeters of mercury.

4. A process according to claim 1 wherein sodium chloride is vaporized and metallic sodium is recovered.

5. A process according to claim 1 wherein potassium chloride is vaporized and metallic potassium is recovered.

6. A process according to claim 1 wherein a mixture of chlorides of metals selected from the said group is vaporized and a metallic alloy is recovered.

7. A process according to claim 6 wherein sylvinite is vaporized, and a sodium-potassium alloy is recovered.

8. A process according to claim 1 wherein magnesium chloride is vaporized and metallic magnesium is recovered.

9. A process according to claim 1 wherein the metallic chloride is supplied to the retort in a liquid state.

10. A process according to claim 1 wherein the calcium carbide is in a granulated state and contains spreading elements.

11. A process according to claim 1 wherein the metallic vapors are condensed into particles which drop by gravity through a liquid inert thereto, whereby the metal is formed into beads.

References Cited in the file of this patent

UNITED STATES PATENTS

| | | |
|---|---|---|
| 380,775 | Thowless | Apr. 10, 1888 |
| 1,319,148 | Freeman | Oct. 21, 1919 |
| 1,528,824 | Hackspill et al. | Mar. 10, 1925 |
| 2,382,713 | Hansgirg | Aug. 14, 1945 |
| 2,465,730 | Kroll | Mar. 29, 1949 |
| 2,583,351 | Bassereau | Jan. 22, 1952 |
| 2,650,085 | Burnett | Aug. 25, 1953 |
| 2,710,798 | Hansley | June 14, 1955 |